(12) United States Patent
Shannon et al.

(10) Patent No.: US 11,912,007 B2
(45) Date of Patent: Feb. 27, 2024

(54) COMPOSITE STRUCTURED LAMINATE AND METHOD OF MANUFACTURE

(71) Applicant: Horton World Solutions, LLC, Southlake, TX (US)

(72) Inventors: Samuel D Shannon, Hardin, TX (US); Fred Arthur Simmons, Southlake, TX (US)

(73) Assignee: HORTON WORLD SOLUTIONS, LLC, Southlake, TX (US)

(*) Notice: Subject to any disclaimer, the term of this patent is extended or adjusted under 35 U.S.C. 154(b) by 77 days.

(21) Appl. No.: 17/301,147

(22) Filed: Mar. 26, 2021

(65) Prior Publication Data

US 2022/0194069 A1 Jun. 23, 2022

Related U.S. Application Data

(60) Provisional application No. 63/199,357, filed on Dec. 21, 2020.

(51) Int. Cl.

| | | |
|---|---|---|
| B32B 41/00 | (2006.01) | |
| B32B 5/02 | (2006.01) | |
| B32B 5/26 | (2006.01) | |
| B32B 37/10 | (2006.01) | |
| B32B 37/24 | (2006.01) | |

(52) U.S. Cl.
CPC .............. *B32B 37/10* (2013.01); *B32B 5/02* (2013.01); *B32B 5/024* (2013.01); *B32B 5/263* (2021.05); *B32B 37/24* (2013.01); *B32B 2255/02* (2013.01); *B32B 2255/26* (2013.01); *B32B 2262/101* (2013.01); *B32B 2262/106* (2013.01); *B32B 2262/14* (2013.01); *B32B 2264/0257* (2013.01); *B32B 2264/108* (2013.01); *B32B 2307/54* (2013.01); *B32B 2307/546* (2013.01)

(58) Field of Classification Search
CPC ........... B32B 37/10; B32B 5/02; B32B 37/24; B32B 2262/101; B32B 2262/106; B32B 2262/14; B32B 2264/0257
USPC .................... 156/60, 64, 350, 351, 378, 379
See application file for complete search history.

(56) References Cited

U.S. PATENT DOCUMENTS

| | | | |
|---|---|---|---|
| 4,372,900 A | 2/1983 | Doerfling | |
| 4,637,949 A | 1/1987 | Manning et al. | |
| 4,743,187 A * | 5/1988 | Schermutzki | B29B 15/12 425/371 |
| 5,565,049 A * | 10/1996 | Simmons | D04H 1/60 156/289 |
| 6,739,023 B2 | 5/2004 | Vonfeldt et al. | |
| 8,490,253 B2 | 7/2013 | Junker et al. | |
| 8,597,453 B2 | 12/2013 | Jang et al. | |
| 9,080,024 B2 | 7/2015 | Weimer et al. | |
| 9,511,513 B2 | 12/2016 | Hull et al. | |
| 9,518,160 B2 | 12/2016 | Humfeld | |

(Continued)

FOREIGN PATENT DOCUMENTS

| | | |
|---|---|---|
| WO | 2011096971 A1 | 8/2011 |
| WO | 2021005302 A1 | 1/2021 |

*Primary Examiner* — Michael N Orlando
*Assistant Examiner* — Joshel Rivera
(74) *Attorney, Agent, or Firm* — BAKER BOTTS L.L.P.

(57) ABSTRACT

Systems and methods for producing a composite structural laminate comprising fabric, polymer, and fiber layers. During production, the laminate base is heated and compressed several times to improve adhesion of the layers which results in improved laminate strength.

14 Claims, 3 Drawing Sheets

TECHNICAL DATA SHEET

| Characteristic | UOM | Average Value | Test Method |
|---|---|---|---|
| Weight | g/m³ | 68 | ASTM D3776 |
| Tensile Strength M.D. | lb/in | 17.87 | ASTM 5035 |
| Tensile Strength C.D. | lb/in | 13.15 | ASTM 5035 |
| Tear Strength M.D | lbs | 6.3 | ASTM 5733 |
| Tear Strength C.D | lbs | 5.9 | ASTM 5733 |
| Elongation M.D. | % | 16 | ASTM 5035 |
| Elongation C.D. | % | 18 | ASTM 5035 |
| Air Permeability | cfm | 208.5 | ASTM D737 |
| Thickness | mils | 13 | ASTM D1777 |

Typical Range +/- 10%

The above information is given for informational purposes only
The properties and values presented herin are to be considered only typical and not binding

(56) References Cited

U.S. PATENT DOCUMENTS

| | | | |
|---|---|---|---|
| 9,650,498 | B2 | 5/2017 | Gleich et al. |
| 10,273,610 | B2 | 4/2019 | Bell et al. |
| 10,457,026 | B2 | 10/2019 | Mhlhause et al. |
| 10,669,659 | B2 | 6/2020 | Tierney et al. |
| 10,828,847 | B2 | 11/2020 | Matsen et al. |
| 10,960,631 | B2 | 3/2021 | Humfeld et al. |
| 11,007,765 | B2 | 5/2021 | Drexler et al. |
| 11,027,503 | B2 | 6/2021 | Chen et al. |
| 11,585,089 | B2 | 2/2023 | Brooks, III |
| 2020/0269522 | A1 | 8/2020 | Blatherwick et al. |
| 2021/0001599 | A1* | 1/2021 | Zhang .................. B29C 70/506 |
| 2021/0206025 | A1 | 7/2021 | Kawabe et al. |
| 2021/0291405 | A1 | 9/2021 | Ochi et al. |

* cited by examiner

TECHNICAL DATA SHEET

| Characteristic | UOM | Average Value | Test Method |
|---|---|---|---|
| Weight | g/m² | 68 | ASTM D3776 |
| Tensile Strength M.D. | lb/in | 17.87 | ASTM 5035 |
| Tensile Strength C.D. | lb/in | 13.15 | ASTM 5035 |
| Tear Strength M.D | lbs | 6.3 | ASTM 5733 |
| Tear Strength C.D | lbs | 5.9 | ASTM 5733 |
| Elongation M.D. | % | 16 | ASTM 5035 |
| Elongation C.D. | % | 18 | ASTM 5035 |
| Air Permeability | cfm | 208.5 | ASTM D737 |
| Thickness | mils | 13 | ASTM D1777 |
| Typical Range +/- 10% | | | |

The above information is given for informational purposes only
The properties and values presented herin are to be considered only typical and not binding

FIGURE 1

| Product Name | CONTINUOUS STRAND FIBERGLASS | Test By | TAISHAN FIBERGLASS INC. |
|---|---|---|---|
| Item Number | TCR986K-4400-14S | Sampling From | Roving Forming Dept. |
| Product Code | 16H16E | Product Grade | A |
| Production Date | 20200429-20200430 | Purchase Order No. | 146326 (135) |
| Barcode Number | | Container No. | CMAU0468423 |
| Lot No | 2004049KS-F021201    2004049KS-F021202    2004049KS-F021203    2004050KS-F021201 | | |
| Lot Capacity | 18224.000 KG | L/C No. | |

General Data:

| Glass Type | TCR - Glass | Filament Diameter | 14 |
|---|---|---|---|
| Color | White | Sizing | Silane |

Properties For Control Report:

| Test Items | Accepted Standards | | Test Results | |
|---|---|---|---|---|
| | Testing Standard | Standard Value | Average Value | Result |
| Moisture content(%) | GB/T 9914.1 idt ISO 3344 | ≤0.20 | 0.02 | PASS |
| Loss on ignition(%) | GB/T 9914.2 eqv ISO 1887 | 0.95±0.15 | 1.02 | PASS |
| Stiffness (mm) | GB/T 7690.4 eqv ISO 3375 | 110±30 | 118 | PASS |
| Linear density(tex) | GB/T 7690.1 idt ISO 1889 | 4400±352 | 4401 | PASS |
| Tex Standard Deviation (%) | GB/T 7690.1 idt ISO 1889 | ≤6.0 | 0.5 | PASS |
| Appearance | GB/T18369 | Refer to GB/T18369 | / | PASS |

FIGURE 2

COMPOSITE STRUCTURED LAMINATE AND METHOD OF MANUFACTURE

CITATION TO PRIOR APPLICATIONS

The present application is a continuation of and claims priority to U.S. Provisional Application No. 63/199,357, titled "COMPOSITE STRUCTURED LAMINATE AND METHOD OF MANUFACTURE" and filed Dec. 21, 2020.

BACKGROUND

Structural panels are used across various industries, but conventionally known approaches to the design and manufacture of such panels provide limited utility particularly with respect to the outward facing surface materials (sometimes referred to as "skins"). In many cases, there is a tradeoff of strength and durability for reduced production costs as illustrated by the conventional panels and skins described below.

Structural Insulated Panels ("SIP") are manufactured panels having a plywood/oriented strand board ("OSB") adhered to either a foam or honeycomb core. These SIPs are used in the housing industry and some commercial buildings though significant problems arise from such use.

For example, even celebrities have reported having problems with property in New Orleans specifically noting houses built in the 9th Ward as being filled with mold and mildew. The houses were designed out of wood SIP panels, but the OSB wood sheathing was not adequately protected. The woods skins absorbed moisture which then rendered the housing uninhabitable in its present state.

Composite Sandwich Panels, also known in the art, are custom fabricated and hand laid in the aircraft and wind turbine industries. These kinds of panels are very expensive—relying on hand-placing matting and fibers, and in some cases aluminum, to make facers or skins. While these skins are more moisture resistant than those used in SIPs, they are too expensive and too slow to produce for practical adoption in other industries including the housing industry.

Glass Mat Technology (GMT) was developed by Georgia Tech to create a way of re-using plastic waste products. The construction industry can use these re-cycled plastics in large volumes. GMT uses composite laminates to adhere to foam or honeycomb to produce small lightweight panels for rooftop installations. Composite laminates have been conventionally used in the automobile industry to make head liners. They typically use polypropylene and fiberglass. Some manufacturers use ½-inch long fibers and others use 2-inch long fibers. The weight per square foot of such laminates is around 0.1 pounds.

Other attempts at creating a structural laminate have been made. For example, numerous woven and non-woven fiberglass "sheathing" has been solidified in other processes to make a structural laminate. These have 0 degree fibers that run parallel to the machine direction and 90 degree fibers that run across the width of the machine. The ability to also have strength in the 45 and −45 degree direction, however, incurs additional costs and slows down the manufacturing process.

SUMMARY

In view of these conventionally known materials and the shortcomings thereof, it is an object of the present disclosure to provide a composite laminate that is cost-efficient and time-efficient to create while also maintaining sufficient protection and quality to make possible its use in the housing industry. For example, a composite laminate in accordance with the present disclosure may be used to create a structural panel that eliminates the problems wood SIPs have. As the laminates are not organic (wood), there is no "food" for mold to grow on. Moreover, the inclusion of graphene into the laminate according to various embodiments of the present disclosure further enhances strength and resilience.

Additionally, composite structural laminates produced according to embodiments disclosed herein have costs per square foot that are approximately 40% cheaper than those of other, similarly-purposed laminates. Conventional laminates have several distinct disadvantages: (1) a slower rate of production; (2) loose fiberglass that may get into a person's hands; (3) in-plane stress and stiffness are equal in all directions (0°, +/−30°, +/−45°, +/−60° and 90° with 0° being the machine direction).

To get near equal stress and stiffness in multiple directions requires meshes with 0°, 45°, and 90° fibers, which results in significantly reduced production speeds.

The processes and methods as embodied in the present disclosure are designed to consolidate polypropylene and fiberglass to levels not seen in the GMT, or other, processes. Numerous conventional processes have been investigated, but such processes result in less consolidation and short fibers which cannot achieve the strength of a composite structural laminate according to embodiments of the present disclosure.

BRIEF DESCRIPTION OF THE DRAWINGS

The following figures are included to illustrate certain aspects of the present disclosure, and should not be viewed as exclusive embodiments. The subject matter disclosed is capable of considerable modification, alteration, and equivalents in form and function, as will occur to one having ordinary skill in the art and the benefit of this disclosure.

FIG. 1 is a table depicting the properties of a scrim for use in accordance with certain embodiments of the present disclosure.

FIG. 2 is a table depicting the properties of fiberglass roving for use in accordance with certain embodiments of the present disclosure.

DETAILED DESCRIPTION OF EMBODIMENTS OF THE PRESENT DISCLOSURE

Figure 3:
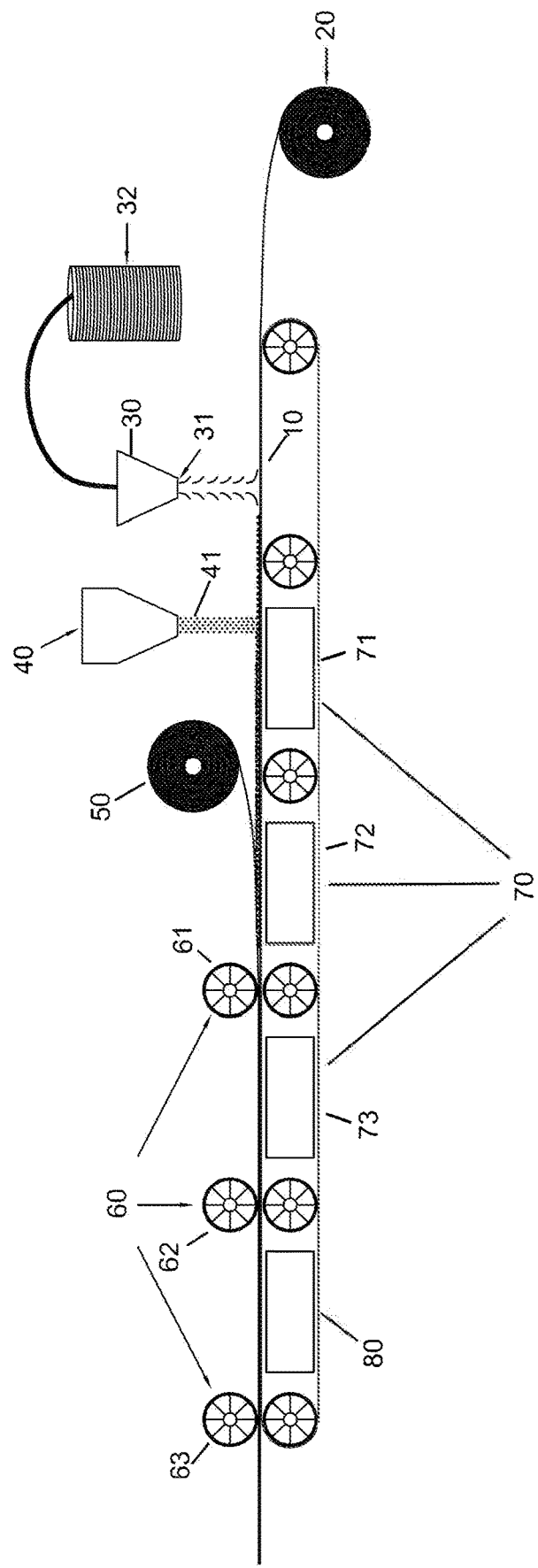
FIG. 3 is a diagrammatic elevated side view of one embodiment of laminate production apparatus in accordance with the present disclosure.

The present disclosure relates generally to the composition and the production of a composite structural laminate.

In certain embodiments, a composite structural laminate comprises scrim, a compounded polymer mixture, and fill material. The scrim serves as a lightweight fabric used on the outside of the laminate to improve adhesion to, for example, adhesives, paint, and coatings. An exemplary scrim may be composed of polyester (such as the polyester scrim set out in FIG. 1), nylon, polyethylene, or any other material conventionally known in the art. The compounded polymer mixture comprises a polymer component, a graphene component, and a multicompatible binder. The fill material may be some form of fiber conventionally known in the art including fiberglass roving, sisal roving, or several varieties of hemp. An exemplary fill material in the form of fiber rovings may have the properties set out in FIG. 2. The composite structural laminate may be formed from a first and second outer scrim layer adhered, or otherwise coupled, to one another having the compounded polymer mixture and fill material disposed therebetween.

In some embodiments, the compounded polymer mixture may further comprise a ultraviolet (UV) radiation protection component which may be any material known in the art for reducing the impact of exposure to UV radiation. In such embodiments, the relative proportion of the described components may be substantially: 96.35% polypropylene component, 1.0-5% graphene component, 1.5-3% multicompatible binder, and 0.15-0.5% UV radiation protection component.

For certain embodiments, the polymer component may be polypropylene. This polypropylene may be purchased in any form conventionally known in the art. Polypropylene having a 10 to 60 Melt Flow Rate (MFR), such as PP1024E4 polypropylene from ExxonMobil, has been found to be the most effective. Similarly, the graphene component may include any size of graphene nanoplatelets though use of XGS C-300 graphene nanoplatelets has produced the best results. The multicompatible binder may be any material or substance known in the art to promote adhesion of polymers to fiberglass. For example, in some embodiments, the multicompatible binder may be Priex 20097.

To create the compounded polymer mixture, the various constituents may be placed in a compounding vat. Within the compounding vat, the constituents may be agitated and heated until the contents of the compounding vat are substantially fluid. Once in this substantially fluid state, the mixed components may then be passed through an extruder to form pellets. The pellets may then be machined down or pulverized to 20 mesh particles.

One embodiment of a method of fabricating the composite structural laminate is depicted in FIG. 3. A first outer scrim layer, composed of ½-3 oz. scrim, is fed from a first scrim roller 20 onto conveyor belt 10. The first outer scrim layer may be between 8 ft-9 ft, 6 in. wide. A fiber chopper 30 is disposed above conveyor belt 10. Fiber roving 31 is fed into fiber chopper 30 which has a knife blade 32 arranged therein and configured to cut fiber roving 31 into 2 in. to 4 in. pieces. As the first outer scrim layer is moved by the conveyor belt, cut pieces of fiber roving 31 exit fiber chopper 30 and are spread along the first outer scrim layer at a rate of approximately 6 grams of cut pieces per foot of scrim. Fibers go in all directions (0 degrees, 10 degrees, 17 degrees, 23 degrees, 33 degrees, 36 degrees 40 degrees, 45 degrees, etc.) in order to create a pseudo-anisotropic product. A fine water mist may then be applied to the scrim and fiber pieces. This will facilitate the attachment of the fiber pieces and the compounded polypropylene mixture powder.

Continuing with FIG. 3, the compounded polypropylene mixture 41, now in powder or particulate form, is placed into polymer distribution chamber 40 which is configured to disperse compounded polypropylene mixture 41 along the first outer scrim layer at a rate of approximately 6-8 grams of compounded polypropylene mixture per foot of scrim.

A second outer scrim layer may then be placed over the first outer scrim layer via a second scrim roller 50 such that the fiberglass pieces and compounded polypropylene mixture are disposed between the first and second outer scrim layers. The combined layers may then be run through a series of rollers 60. The series of rollers may include three roller pairs 61, 62, and 63 wherein each pair comprises an upper roller and a lower roller. The combined layers are passed between the upper and lower rollers to apply pressure to both the first and second outer scrim layers thereby forming a completed composite structural laminate.

As shown in FIG. 3, fabrication of the composite structural laminate may also involve a series of heater units 70 and at least one cooler unit 80. The series of heater units 70 includes heaters units 71, 72, and 73. Heater unit 71 may be arranged between polymer distribution chamber 40 and second scrim roller 50. Heater unit 72 may be arranged between second scrim roller 50 and roller pair 61. Heater unit 73 may be arranged between roller pair 61 and roller pair 62. The heater units may be of any kind conventionally known in the art and be set to approximately 500 degrees Fahrenheit. The heat and compression applied by series of heater units 70 and series of rollers 60, respectively, serve to strengthen the adherence of the composite structural laminate's constituent components to one another. Cooler unit 80 may be arranged between roller pair 62 and roller pair 63. The cooler unit 80 may be of any kind conventionally known in the art and set between approximately 110-165 degrees Fahrenheit. After passing through roller pair 63, the formed composite structural laminate may be cut to a desired size.

The composite structural laminate and methods of production disclosed herein improve upon the conventional processes by incorporating graphene and both long and continuous fibers directly into the laminate. Embodiments of the presently disclosed processes are designed to create up to a 9.5 foot wide laminate at the rate up to 25 feet per minute on a single machine. There are no known conventional methodologies with this rate of production.

Referring to FIG. 3, one embodiment of an apparatus and method to produce a composite structural laminate has been described. Noting the advantageous aspects of the present disclosure above, improved consolidation of the various constituent components as previously described is achieved by the addition of nip rollers in critical locations: in-between heater units, before a cooler unit, and after the cooler unit. In conventional lamination processes there is no nip roller between heater units and between heater/cooler banks. The presently disclosed arrangement of nip rollers assists in the compaction of the fiber into the polypropylene and to spread the polypropylene to improve consolidation. Improved consolidation improves laminate strength.

Projected strengths of composite structural laminates produced according to the various embodiments of the present disclosure are between 12,000 to 22,000 psi tensile and a stiffness range of 800,000 to 1,000,000 psi. The materials being used, and the process of melting the products together, create an inert product, and the product does not give off gas volatile organic compounds ("VOCs").

The amount of polypropylene and fiber used may be varied to produce laminates having different weights as may be needed to satisfy project-specific requirements, regulations, or restrictions. To vary the amount of polypropylene and/or fiber, the speed at which the individual component materials are applied to the bottom scrim layer may be adjusted while maintaining a constant speed for the conveyor system that ultimately results in the combination of the materials to make the laminate.

With respect to the application of polypropylene, in embodiments wherein rollers are used to deliver the polypropylene to the scrim, the speed of those rollers may be adjusted to meet the target polypropylene weight. Similarly, the speed at which the fiber is cut, or chopped, and delivered (via rollers or otherwise) may also be adjusted to meet the target fiber weight. Furthermore, the speeds of the respective delivery systems may be adjusted independently to provide greater variability of polypropylene and fiber weights in the laminate.

In certain embodiments of the present invention, the produced, consolidated laminate has a weight of 1,200 grams/sq. meter. Such a laminate may be composed of approximately 40-60% polypropylene and a corresponding 40-60% fiber wherein the respective percentages are relative to the total combined weight of polypropylene and fiber. For example, in the 1,200 grams/sq. meter laminate described previously, the laminate may contain approximately 650 grams/sq. meter of polypropylene (~54%) and 550 grams/sq. meter of fiber (~46%).

In other embodiments, laminates may be made having weights of 800 to 2,400 grams/sq. meter. In such embodiments, the laminate composition may include similar respective percentages of polypropylene and fiber as described above.

Although the disclosure has been described and illustrated with respect to exemplary objects thereof, it will be understood by those skilled in the art that various other changes, omissions, and additions may be made therein and thereto without departing from the scope of the present disclosure.

The invention claimed is:

1. A method for manufacturing a composite structural laminate comprising:
   distributing a first quantity of a fiber on a first layer of a fabric material;
   distributing a second quantity of a polymer mixture on the first layer of the fabric material, wherein the polymer mixture comprises a binder element, a polymer element, and a graphene element;
   disposing a second layer of the fabric material on top of the first layer of the fabric material to form a laminate base;
   passing the laminate base through a plurality of rollers to produce a composite laminate,
   wherein the polymer mixture has a relative composition of approximately at least 90% of the polymer element, at least 1% of the graphene element, and at least 1% of the binder element.

2. The method of claim 1, wherein the graphene element is a plurality of graphene nanoplatelets.

3. The method of claim 1, wherein the polymer element is polypropylene.

4. The method of claim 1, wherein the plurality of rollers comprises a first roller pair, a second roller pair, and a third roller pair.

5. The method of claim 4, further comprising passing the laminate base over a first heating element prior to the passing through the plurality of rollers.

6. The method of claim 5, wherein a second heating element is disposed between the first roller pair and the second roller pair.

7. The method of claim 6, wherein a first cooling element is disposed between the second roller pair and the third roller pair.

8. The method of claim 1, wherein the composite laminate has a tensile strength of at least 12,000 psi and a stiffness range of approximately 800,000 to 1,000,000 psi.

9. The method of claim 1, further comprising, after distributing the first quantity of the fiber on the first layer of the fabric material, applying a water mist to the fiber distributed on the first layer of the fabric material.

10. The method of claim 1, further comprising distributing the first quantity of the fiber anisotropically on the first layer of the fabric material.

11. The method of claim 1, further comprising distributing the first quantity of the fiber on the first layer of the fabric material at a rate of approximately 6 grams of the fiber per foot of the first layer of the fabric material.

12. The method of claim 1, further comprising distributing the second quantity of the polymer mixture on the first layer of the fabric material at a rate in a range from 6 to 8 grams of the polymer mixture per foot of the first layer of the fabric material.

13. The method of claim 1, further comprising producing the composite laminate at a rate of up to 25 feet per minute.

14. The method of claim 1, further comprising repeatedly heating and compressing the laminate base to produce the composite laminate.

* * * * *